(12) United States Patent
Bar

(10) Patent No.: US 7,520,376 B2
(45) Date of Patent: Apr. 21, 2009

(54) CONVEYOR SYSTEM FOR WORK PIECES OR OBJECTS

(76) Inventor: Ralf Bar, Fasanenweg 1, Gemmingen (DE) D-75050

( * ) Notice: Subject to any disclaimer, the term of this patent is extended or adjusted under 35 U.S.C. 154(b) by 445 days.

(21) Appl. No.: 11/286,242

(22) Filed: Nov. 22, 2005

(65) Prior Publication Data

US 2006/0113168 A1 Jun. 1, 2006

Related U.S. Application Data

(63) Continuation of application No. PCT/DE2004/002802, filed on Dec. 22, 2004.

(30) Foreign Application Priority Data

Apr. 21, 2004 (DE) .................. 10 2004 019 922

(51) Int. Cl.
*B65G 17/00* (2006.01)
*B65G 35/06* (2006.01)
*B65G 47/26* (2006.01)

(52) U.S. Cl. .................. 198/465.1; 198/867.15; 198/515

(58) Field of Classification Search .......... 198/465.1, 198/515, 516, 867.15
See application file for complete search history.

(56) References Cited

U.S. PATENT DOCUMENTS

| 4,354,435 A | * | 10/1982 | Wakabayashi | 104/172.4 |
| 4,771,700 A | * | 9/1988 | Wakabayashi | 104/172.3 |
| 4,776,452 A | * | 10/1988 | Burkhardt | 198/867.14 |
| 5,046,598 A | | 9/1991 | Colamussi | |

(Continued)

FOREIGN PATENT DOCUMENTS

DE 1 289 781 2/1969

(Continued)

OTHER PUBLICATIONS

International Preliminary Report on Patentability dated Nov. 15, 2006 for corresponding International Application No. PCT/DE2004/002802.

*Primary Examiner*—Douglas A Hess
(74) *Attorney, Agent, or Firm*—Darby & Darby P.C.

(57) ABSTRACT

A conveying system (10) for workpieces or objects, comprising a guide profile (14), conveying carriages (12) which can be moved along the guide profile (14) and in each case have a holding unit, in particular a pallet (58) or gondola, for at least one workpiece or at least one object, a first form-fitting unit (20) which can be moved substantially parallel to the guide profile (14) by means of a drive assembly (52), and a first mating form-fitting unit (22) which is respectively mounted on each conveying carriage (12) and can be coupled to the first form-fitting unit (20), is characterized by a first coupling unit (26), by means of which the coupling of the first form-fitting unit (20) to the respective first mating form-fitting unit (22) can optionally be engaged and disengaged, a stationary second form-fitting unit (30) running substantially parallel to the guide profile (14), a second mating form-fitting unit (32) in each case mounted on each conveying carriage (12) such that it can be coupled to the second form-fitting unit (30), and a second coupling unit (36), by means of which the coupling of the second form-fitting unit (30) to the respective second mating form-fitting unit (32) can optionally be engaged and disengaged.

37 Claims, 9 Drawing Sheets

U.S. PATENT DOCUMENTS

| | | | | |
|---|---|---|---|---|
| 5,076,172 | A * | 12/1991 | Grimm et al. | 104/166 |
| 5,465,826 | A * | 11/1995 | Noestheden | 198/465.3 |
| 6,588,579 | B2 * | 7/2003 | Taeger | 198/687.1 |
| 6,637,342 | B1 * | 10/2003 | Jennings et al. | 104/172.3 |
| 7,191,891 | B2 * | 3/2007 | Hoveling | 198/345.3 |
| 7,255,220 | B2 * | 8/2007 | Iwai et al. | 198/465.3 |

FOREIGN PATENT DOCUMENTS

| | | |
|---|---|---|
| DE | 36 16 252 C2 | 11/1987 |
| DE | 39 18 087 A1 | 2/1990 |
| DE | 38 36 952 C2 | 5/1990 |
| DE | 38 74 092 T2 | 1/1993 |
| DE | 43 11 519 A1 | 10/1994 |
| DE | 94 16 115 U1 | 8/1995 |
| DE | 195 28 922 A1 | 4/1996 |
| DE | 195 17 276 A1 | 11/1996 |
| DE | 692 10 922 T2 | 12/1996 |
| DE | 195 38 350 A1 | 4/1997 |
| DE | 196 33 096 C1 | 2/1998 |
| DE | 199 49 084 A1 | 4/2001 |
| DE | 696 11 070 T2 | 4/2001 |
| DE | 101 35 591 A1 | 1/2003 |
| DE | 102 29 440 A1 | 1/2004 |
| EP | 0 256 926 B1 | 2/1988 |
| EP | 0997402 A2 | 5/2000 |
| FR | 2 626 858 A1 | 8/1989 |
| WO | WO-03/064295 A1 | 8/2003 |

* cited by examiner

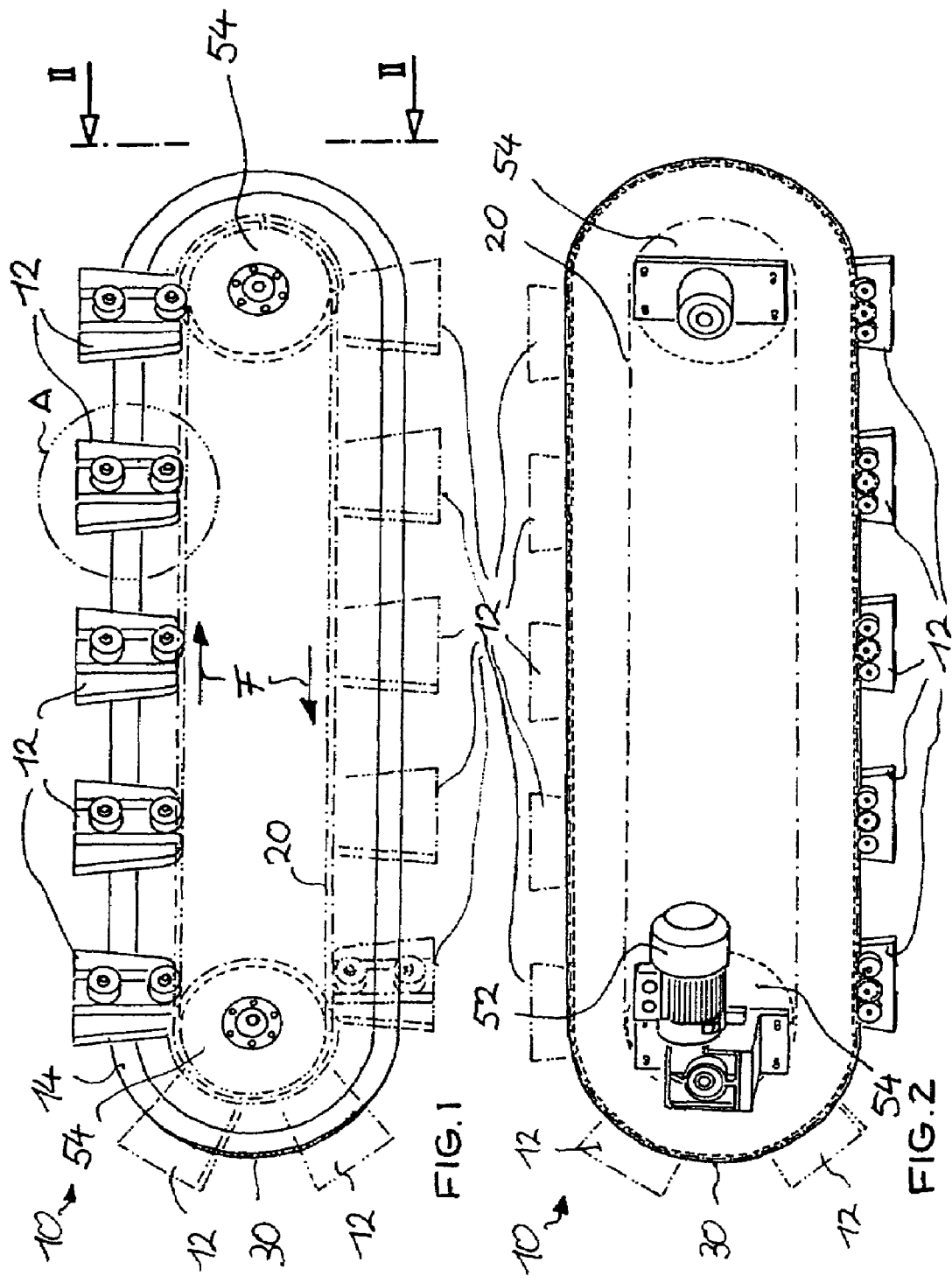

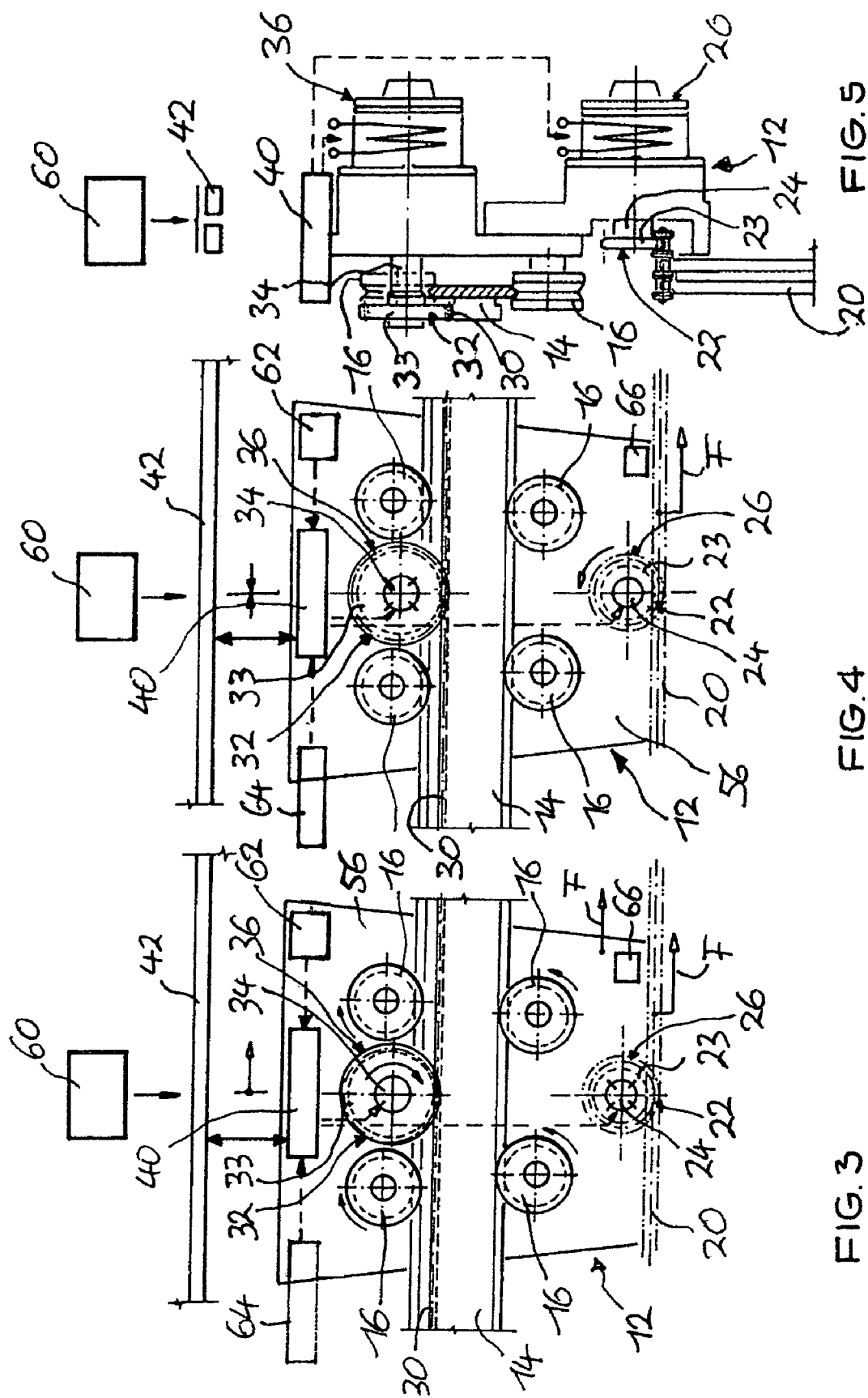

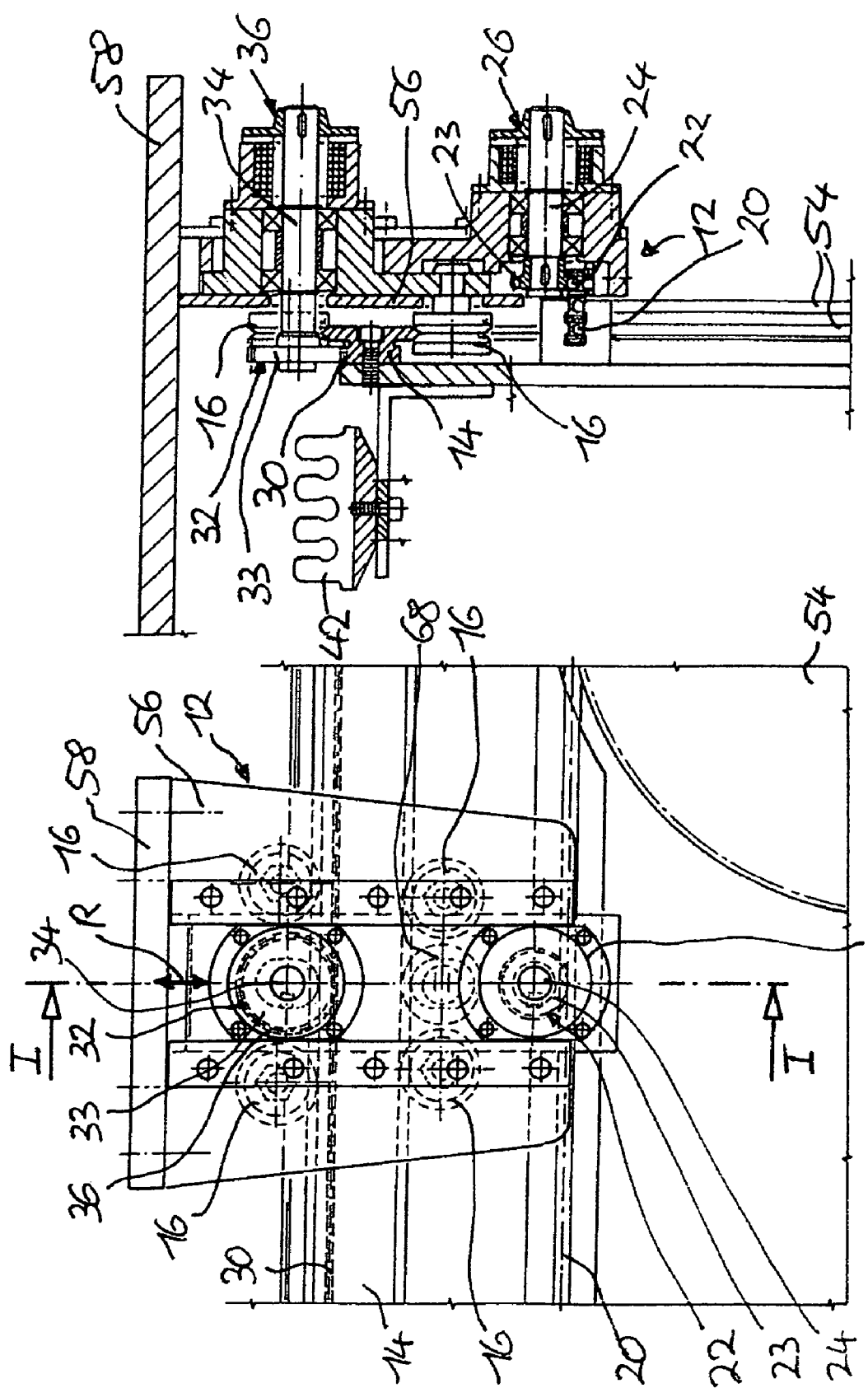

CONVEYOR SYSTEM FOR WORK PIECES OR OBJECTS

CROSS REFERENCE TO PRIOR APPLICATION

This application is a continuation of International Patent Application Serial No. PCT/DE2004/002802, filed Dec. 22, 2004, which claims priority of German Patent Application No. 10 2004 019 922.1, filed Apr. 21, 2004 which is incorporated by reference herein. PCT/DE2004/002802 published in German on Nov. 3, 2005 as WO 2005/102876 A1.

TECHNICAL FIELD

The present invention relates to a conveying system for workpieces or objects, comprising a guide profile, conveying carriages which can be moved along the guide profile and in each case have a holding unit, in particular a pallet or gondola, for at least one workpiece or at least one object, a first form-fitting unit which can be moved substantially parallel to the guide profile by means of drive assembly, and a first mating form-fitting unit which is respectively mounted on each conveying carriage and can be coupled to the first form-fitting unit.

PRIOR ART

Horizontally circulating pallet conveying systems with a lining-up action are known. According to a first principle, the pallets are transported horizontally from an unloading point to a loading point, are then separated and fed to a raising/lowering station, which in turn transfers the individual pallets to a return, which is connected to a further raising/lowering station which feeds the respective pallets to the loading station again.

According to a second principle, a further horizontally circulating belt transport system is known, which has a circulating belt unit with a belt drive and no raising/lowering station. In order to drive the pallets, use is made of a frictional element which, for example, is constructed as a friction pinion or leaf spring. The disadvantage of this system is wear of the friction element. Vertical pallet transport is not possible, since the pallets have to be carried along securely but, on the other hand, in queuing operation, a certain amount of slippage of the friction element must be provided in order that the transport chain can continue to run. In many known systems which function in accordance with this principle, functional faults or increased wear during the transport and in the region of the deflection frequently occur.

Vertical transport systems are known which operate on the cyclic principle with a chain drive or rope drive. In this case, the pallets are present at a fixed distance from one another. The vertical transport system is constructed as a lifting station with a storage function, which operates in accordance with the "first in-first out" principle. Vertical transport systems are also known in which circulating gondolas arranged at a fixed distance are used.

A conveying system with lining-up action in the vertical direction is not known.

SUMMARY OF THE INVENTION

Starting from the aforementioned prior art, the present invention is based on the object and the technical problem of specifying a conveying system for workpieces or objects of type mentioned at the beginning which exhibits very great variability with regard to its intended use or field of employment, ensures a permanently reliable function and can be produced economically. In this case, a cycled, buffered or accumulating or manual conveying operation, even as a vertical conveyor, is alternately to be possible.

The conveying system according to the invention is accordingly characterized by a first coupling unit, by means of which the coupling of the first form-fitting unit to the respective first mating form-fitting unit can optionally be engaged and disengaged, a stationary second form-fitting unit running substantially parallel to the guide profile, a second mating form-fitting unit in each case mounted on each conveying carriage such that it can be coupled to the second form-fitting unit, and a second coupling unit, by means of which the coupling of the second form-fitting unit to the respective second mating form-fitting unit can optionally be engaged and disengaged.

According to a preferred refinement, each conveying carriage has a control device which can be activated, by means of which the first and second coupling unit can be activated.

A particularly advantageous refinement which permits a manual conveying movement in a simple manner is distinguished by the fact that at least one or each conveying carriage has a switching unit which can be actuated manually in order to control the switching state of the first and second coupling units.

According to the invention, each conveying carriage is supplied with power. Thus, a first design variant is distinguished by the fact that the power supply of the conveying carriage and of the control device and the first and second coupling units is carried out via a busbar which runs parallel to the guide profile or is integrated into the guide profile and with which contact can be made.

A second design variant is distinguished by the fact that the power supply of the conveying carriage and of the control device and the first and second coupling units is carried out via an energy storage unit, in particular an accumulator, arranged on the conveying carriage.

An advantageous development which can be implemented particularly simply in control terms is distinguished by the fact that the control device has a relay or an electronic circuit that can be activated, in particular a programmable microchip. In this connection, it is advantageous, in addition to the busbar with which contact can be made, to use a bus system having a bus rail and bus system electronics, such that each conveying carriage can be identified individually and addressed specifically. In this case, an electronics unit, for example a known bus module, travels with and on each pallet. The opening/closing or switching of the first and second coupling unit is then carried out with direct activation, decentrally via this concomitantly traveling electronics unit. The information exchange between the concomitantly traveling bus module and control system on each pallet is carried out via the bus system. It is also possible for the control system arranged on the pallet to be addressed individually for each pallet via radio.

A constructionally particularly simple refinement which permits simple control of each conveying carriage is distinguished by the fact that the conveying carriage has at least one signal receiving unit, which can be acted on by at least one external signal generator unit and which acts on the control device in accordance with the signal received, whereupon the control device switches the first and/or second coupling unit.

A particularly advantageous refinements which has a robust construction and ensures a permanently reliable function is distinguished by the fact that the first and/or second mating form-fitting unit has a gear wheel or a pinion, the first form-fitting unit is constructed as a circulating chain, in particular triplex chain, and the second form-fitting unit is constructed as a rack or rigid chain.

A further advantageous refinement which permits a compact construction is distinguished by the fact that the second form-fitting unit is arranged mounted on the guide profile.

A constructionally particularly simple and compact design variant which permits particularly economic production and simple activation is distinguished by the fact that the first mating form-fitting unit is in engagement with the first form-fitting unit and has a first rotating shaft rotatably mounted on the conveying carriage, the first coupling unit is constructed as a clutch or braking unit, in particular an electromagnetic clutch or braking unit, which couples the first rotating shaft to the conveying carriage or switches it to freewheel, and/or that the second mating form-fitting unit is in engagement with the second form-fitting unit and has a second rotating shaft which is rotatably mounted on the conveying carriage, the second coupling unit is constructed as a clutch or braking unit, in particular an electromagnetic clutch or braking unit, which couples or fixes the second rotating shaft to the conveying carriage or switches it to freewheel.

Likewise with regard to a compact construction, an advantageous development is distinguished by the fact that the first and second coupling units are arranged on the first and second rotating shaft, respectively.

In order to prevent high compulsive forces, which promote wear, arising in the region of the deflection of the conveying, a particularly preferred refinement is distinguished by the fact that the first and/or second mating form-fitting unit are rotatably mounted on the conveying carriage via a bearing unit, the bearing unit being mounted on the conveying carriage such that it can be displaced in the direction transverse with respect to the conveying direction.

An optimized refinement which is advantageous with regard to maximum variability is distinguished by the fact that the control device can be activated via an external further control device, which responds in a specific manner on the basis of the boundary conditions of the individual conveying carriages of the conveying system, and therefore an extremely wide range of conveying operations can be implemented.

In a preferred embodiment which can be implemented economically and permits high accuracy when positioning the respective pallets, the at least one signal receiving unit and the at least one signal generating unit are constructed as a light barrier unit with receiver and transmitter.

A particularly preferred refinement is distinguished by the fact that, for each conveying carriage, there is a distance registering unit for registering the distance of a following conveying carriage from a preceding conveying carriage which, when the distance exceeds/falls below a predefined minimum, outputs a signal to the control device, which then interrupts or arranges for of the conveying movement of the following conveying carriage.

In order to transfer any desired pallet at any desired point of the conveying path in a simple manner, an advantageous development is distinguished by the fact that there is a position registering unit for registering the position of conveying carriages along the conveying path which, when a predefined position is reached, outputs a signal to the control device of the respective conveying carriage, which then interrupts the conveying movement of the conveying carriage.

In construction terms, the position registering unit according to a preferred exemplary embodiment can be implemented in that each conveying carriage has an initiator and a control flag, the control flag switching the initiator of the following conveying carriage when the minimum distance between adjacent conveying carriages is reached.

In order to ensure optimal guidance of the conveying carriages on the guide profile, corresponding guide means or guide elements, in particular guide rollers, are preferably used.

In order also to be able to implement an S-shaped deflection along the conveying path without difficulty, a particularly advantageous refinement is distinguished by the fact that there are guide means arranged opposite on the guide profile, which are arranged, in particular in pairs, on a rotating bogie rotatably mounted on the conveying carriage.

The first form-fitting unit is preferably constructed as a circulating unit which can be driven via a drive assembly, the drive assembly in an advantageous refinement having a slipping clutch, which prevents the first form-fitting unit being damaged in the event of any possible faults.

The drive assembly can be constructed such that it can be activated in such a way that a cyclic, accelerated or retarded conveying movement with different acceleration values can be implemented as desired.

The conveying system according to the invention can also be used without difficulty as a vertical conveyor. Because of the characteristics outlined above, the combining system has a lining-up action, that is to say the individual conveying carriages are conveyed independently of the cycle rate. The system can be used as a workpiece store. In this case, workpieces can be delivered on a delivery side and at the same time removed at a removal point while other conveying carriages are under way on the conveying section. It is also possible for a plurality of loading/removal points to be provided. The loading/unloading of the pallets can be carried out manually or via an automatic loading system, such as a robot or the like.

As a result of the form-fitting connection between the second form-fitting unit and the second mating form-fitting unit, in the event of interruption to conveying movement, the respective conveying carriage is also held securely in the vertical direction (vertical conveyor).

It is possible to dispense completely with the use of a friction element as in the prior art.

A particularly advantageous design variant which has a permanently reliable function in connection with an extremely simple constructional structure that can be produced economically is distinguished by the fact that, in the state in which the conveying carriage is moving, the first coupling unit switches the first mating form-fitting unit into the coupling state with the first form-fitting unit and the second coupling unit switches the second mating form-fitting unit to freewheel and, in the state in which the conveying carriage is stopped, the first coupling unit switches the first mating form-fitting unit to freewheel and switches the second coupling unit into the coupling state of the second mating form-fitting unit with the second form-fitting unit or fixes the second mating form-fitting unit.

In a design variant which can be implemented constructionally simply, in order to transport the conveying carriages, a moving chain and a stationary, rigid chain or rack is used as a form-fitting unit. The mating form-fitting units are constructed as pinions and alternately switched into engagement with the respective form-fitting unit, which means that, during the transport of the conveying carriage, the pinion of the transport chain is switched rigidly and the pinion of the rank rotates freely while, when the conveying carriage is stopped, the pinion of the transport chain rotates freely and the pinion on the rack is switched rigidly. The second coupling unit is in this case preferably constructed as an electromagnetic braking unit and the first coupling unit is preferably constructed as an electromagnetic clutch unit.

In the de-energized state, the pinion of the second mating form-fitting unit cannot move, which signifies an additional crash safeguard. The power supply is provided via a busbar, each conveying carriage having a wiping contact as a current pick-up. In an exemplary embodiment, each conveying carriage has an initiator, in order to stop the conveying carriage when running against another conveying carriage or at the loading/unloading points. As a result, with appropriate setting of a switching flag of the preceding conveying carriage, queuing pressure is advantageously avoided. By means of a second initiator and an additional current busbar, it is even possible to dispense with separating the conveying carriages at the stopping points.

Stop cams advantageously to be provided at the loading and unloading point stop the conveying carriage when the initiator is switched. The respective conveying carriage is preferably released by means of a logical AND combination with the damped initiator with energization of the busbar.

The conveying carriages are guided securely in a curve by a guide. The guide can advantageously be integrated directly into the rack. This ensures that, when traveling in a curve, the pinion of the first mating form-fitting unit of the conveying carriage cannot slip out of the chain. The first form-fitting unit is advantageously constructed as a triplex transport chain, the deflection sprocket in the region of the deflection part as a duplex sprocket and the pinion on the conveying carriage as a single pinion.

The conveying system according to the invention provides a large number of advantages, which will be listed below by way of example.

Thus, vertical, lining-up pallets transport is possible, which means that a small requirement for floor space within production lines can be implemented. The conveying system can be used as a decoupling module between production lines. In the case of manual loading, because of the incoming storage function of the system, the operator can move away for a specific time without the functionality of the system suffering from this. It is possible without difficulty for a "first in-first out" principle to be implemented with, at the same time, a lining-up action of the individual conveying carriages. The incoming conveying carriages do not cause any queuing pressure, which has a beneficial effect on a permanently reliable functionality of the system. Furthermore, there is relatively low wear, since there are no mechanical latching-in operations, in particular in the deflection area, as in the known systems. The system can be erected vertically, horizontally and even, for example as a mounting system, on edge. The system can be produced economically, since only one main drive has to be used for the first form-fitting unit or chain.

In the case of the construction with a rotary bogie design, a simple passage can be created in production lines, for example for stackers to drive through as a passage for personnel. The receiver of a light barrier can be mounted on all the pallets or conveying carriages. A transmitting part of the light barrier is installed at the corresponding stopping point. The pallets can therefore be stopped when the transmitter turns the light barrier on. On the stationary part, that is to say on the transmitting part, the voltage is simply removed in order to travel onward. As a result, the pallet travels onward. This constitutes a cost-effective solution for the control.

With the conveying system according to the invention it is also possible without difficulty to position workpiece carriers having a plurality of workpieces in the gondolas/pallets of the conveying system. Workspace carriers which circulate within the operation can be positioned on the gondolas/pallets of the conveying system. As a result, repacking of workpieces is dispensed with. The positioning of the workpiece carriers within the operation can also be carried out automatically by a loading/unloading device. And the stopping points for loading/unloading the one-piece carriers, it is possible to move to a plurality of positions, the example by using a plurality of transmits outlined areas, which act on the corresponding receivers on the conveying carriages or pallets/gondolas. They pallets/gondolas are cycled with the accuracy of the second form-fitting unit (rack). As a result of the provision of a plurality of transmitter light barriers or sensors of any other time, it is possible to use a removal robot which can be displaced about only one axis and, as a result, an area (distribution of the workpieces on the workpiece carrier) can nevertheless be processed.

With the conveying system according to the invention, it is also possible to implement the feeding of raw parts and removal of finished parts on the same belt. The feeding of parts in a process and the returning of the processed parts to the delivery point can take place on the same belt. This has the advantage that the operator loads and unloads at the same position. It is also possible for a plurality of automated processes, for example input/output for additional processing, to take place with one belt via the link.

The conveying system according to the invention can also be used without difficulty as a constituent part of an assembly belt. In such an assembly system, the circulating pallets or assembly carriages can be cycled in regions by the control device, on account of the possible individual addressing, can be unbuffered/accumulated in the regions or shifted manually by a worker. Therefore, for example, short failure times of individual processes can be intercepted by buffering or the workers can be used flexibly in a processing/assembly process.

The conveying system according to the invention can also be used within the context of a sorting system. Normally, the pallets/components of a sorting system are connected permanently to the chain. According to the invention, however, the individual pallets can be addressed individually and the distance from one another can be changed accordingly. Therefore, an extremely wide range of packing patterns can be implemented, even with different size. It is merely necessary to take care that the products can be positioned reliably in the through adjacent pallets arranged at a correspondingly variable distance.

In a design variant according to the invention, the conveying system according to the invention is used in the context of a palleting system. In this case, via an inlet belt operating cyclically, objects are fed cyclically to the conveying system. An external control device determines the size of the respective object to be palleted in advance and arranges for the conveying carriages to be arranged at a distance which corresponds to the respective goods to be palleted to be picked up. The conveying carriages are then available cyclically at the pick-up position at an appropriate distance for the pick-up. In this case, the respective pallets form a pick-up train which corresponds to the width of the pallet. As soon as this pick-up train has been filled, it is moved into a removal position in which the pallets are pushed onto the pallet. At the same time, the second train of pallets is used, which has previously been positioned to the respective geometry of the objects to be palleted and is fed to the pick-up positioned or is present at the latter as soon as the first train has been moved to the removal position. In this case, use is made of a conveying system in which two chains arranged parallel beside each other are preferably employed. The conveying movement of the respective train corresponding to the cycle rate or cycle time of the inlet belt, the transport time to the removal station and the transport time for the return movement into the pick-up position is implemented by implementing the size determined by the external control device of the respective pick-up compartments formed by adjacent pallets.

Further embodiments and advantages of the invention emerge from the features further listed in the claims and from the exemplary embodiments specified below. The features of the claims can be combined with one another in any desired away, provided they are not obviously mutually exclusive.

BRIEF DESCRIPTION OF THE DRAWINGS

The invention and advantageous embodiments and developments of the same will be described and explained in more detail in the following text by using the examples illustrated in the drawing. According to the invention, the features to be gathered from the description and the drawing can be applied individually on their own or in a plurality in any desired combination. In the drawing:

FIG. 1 shows a schematic representation of a constructional design variant of a conveying system having a plurality of conveying carriages (without illustrating the associated pallets or gondolas) which can operate in lining-up/buffering operation, a conveying chain that can be driven and a stationary rack being used as form-fitting units, in which corresponding mating form-fitting units of the respective conveying carriage engage, in a plan view, FIG. 2 shows a schematic representation of the conveying system according to FIG. 1 in a bottom view, FIG. 3 shows a highly schematic representation of the detail A according to FIG. 1 in a moving conveying carriage, FIG. 4 shows a highly schematic representation of the detail A according to FIG. 1 with the conveying carriage in the stop position, FIG. 5 shows a schematic side view of the representation of a conveying carriage according to FIG. 3 or 4, FIG. 7 shows a schematic section through the conveying carriage according to the section I-I in FIG. 6, FIG. 8 shows a schematic side view of a constructional design variant according to FIG. 1 in the viewing direction II-II.

WAYS OF IMPLEMENTING THE INVENTION

Figure 6:
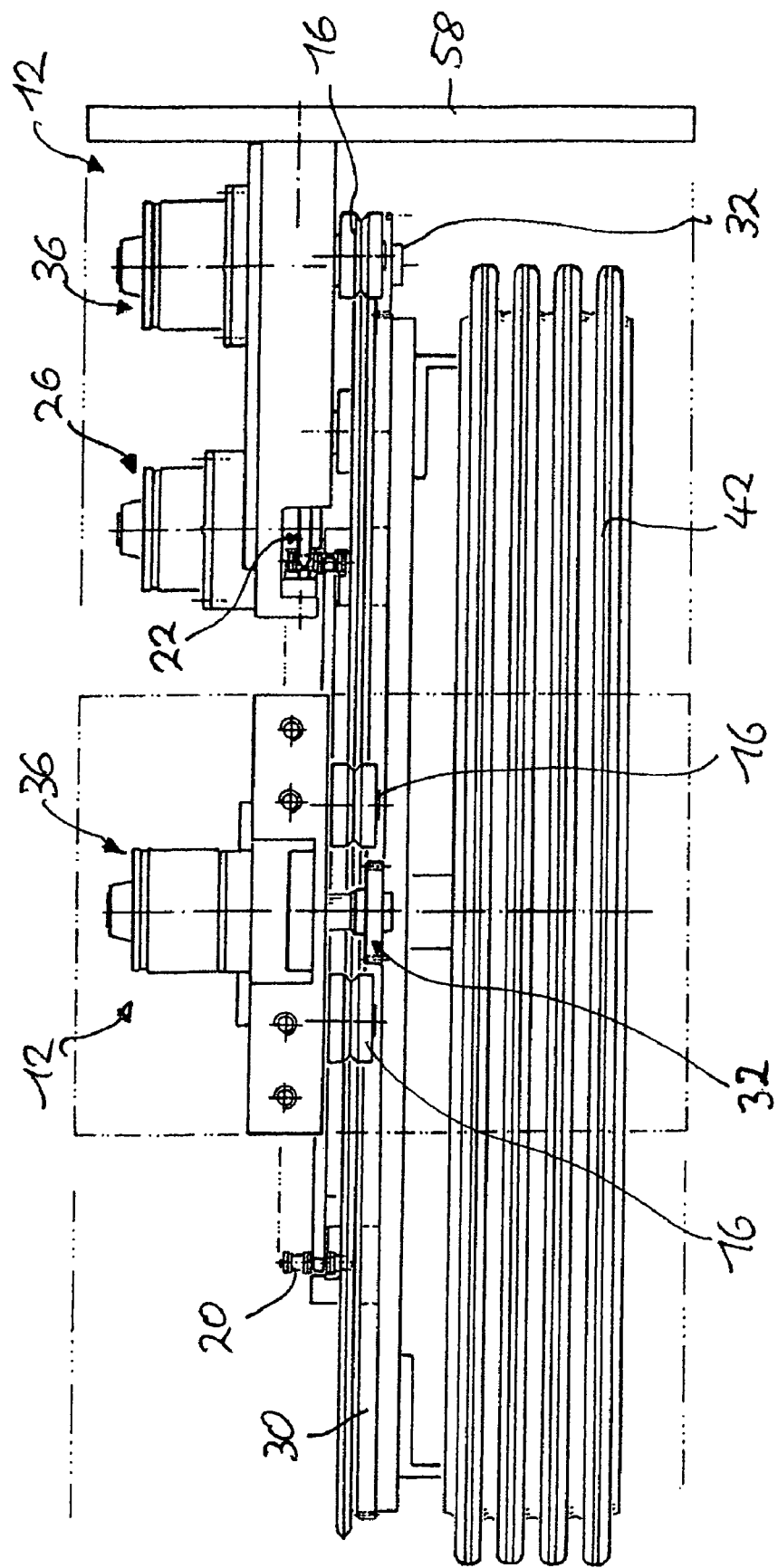
FIG. 6 shows a schematic plan view of a constructional refinement of the conveying carriage according to detail A in FIG. 1.

In FIGS. 1 and 2, a conveying system 10 is illustrated schematically in a plan view and bottom view, respectively, having a guide profile 14 on which a plurality of conveying carriages 12 are mounted such that they can be displaced in the conveying direction F. The guide profile 14 is as a closed circulating guide profile having opposite rectilinear courses and in each case side edge regions having a semicircular curvature. On the guide profile 14 there is a second form-fitting unit 30 which, in the exemplary embodiment, is constructed as an outwardly pointing integrated rack. Offset inwardly parallel to the guide profile 14 there is a circulating first from-fitting unit 20 which, in the exemplary embodiment, is constructed as a chain and which, in the end region, is in each case led over a rotary crown wheel 54, the chain (form-fitting unit 20) in the exemplary embodiment being constructed as a triplex train and the rotary crown wheels 54 as double rotary crown wheels.

The rotary crown wheel 54 on the left in FIG. 2 is driven by a drive assembly 52, so that the first form-fitting unit 20 moves in the conveying direction F.

In the case in which the conveying carriages 12 move, these are coupled to the first form-fitting unit 20. When a conveying carriage 12 is stopped, this coupling is canceled. The manner of the coupling will be described in the following text by using FIGS. 3 to 5. FIGS. 3 and 4 are drawn as transparent for clarity.

A total of four guide rollers 16 are rotatably mounted on a base unit 56 of the conveying carriages 12. The guide rollers 16, which are arranged as a distance, bear oppositely on the guide profile 14 and, circumferentially, each have a groove in which the respective side edge of the guide profile 14 engages. In the lower region of the base unit 56 in FIGS. 3 and 4, in the region between the guide rollers 16, there is a first mating form-fitting unit 22, which has a pinion 23 and a first rotating shaft 24, which is rotatably mounted on the base unit 56. On the first rotating shaft 24, on the opposite side of the base unit 56, there is a first coupling unit 26 (FIG. 5), which is constructed as an electromagnetic clutch unit.

The pinion 23 engages in the chain of the first form-fitting unit 20.

On the side of the guide profile 14 opposite the first form-fitting unit 20 there is a second, mating form-fitting unit 32, which has a second pinion 33 and a second rotating shaft 34, which is rotatably mounted on the base unit 56. On the opposite side of the base unit 56, on the second rotating shaft 34, there is arranged a second coupling unit 36 (FIG. 5), which is constructed as an electromagnetic braking unit. Here, the second pinion 33 engages in the rack of the second form-fitting unit 30.

Furthermore, FIGS. 3 to 5 illustrate a control device 40 schematically, by means of which the switching state of the first and second coupling units 26, 36 can be control. The power supply of the conveying carriage 12 is provided via a busbar 42 illustrated schematically in FIGS. 3 to 5 and an appropriately constructed wiping contact on the conveying carriage 12. Via the busbar 42, the control device 40 is supplied with power and is activated, the control device 40 being constructed as a relay in one exemplary embodiment.

Finally, in FIGS. 3 to 5, also highly schematically, an external control device 60 is illustrated by means of which there is the possibility of addressing the control device 40 of each conveying carriage 12 individually. To this end, for example, the known bus technology can be used, appropriate electronics traveling concomitantly on the conveying carriage 12 in the form of the control device 40 and the busbar 42 having corresponding bus connections.

It is also possible, in a further design variant, for the control device 40 to be addressable via radio by the external control device 60.

Furthermore, on the base unit 56, in the top right corner region, a first initiator 62 is illustrated, which has a communications connection to the control device 40. Finally, in the opposite top left corner region, there is a control flag 64 on the conveying carriage 12 which has a projection beyond the base unit 56 in the direction of the following conveying carriage 12. Furthermore, a second initiator 66 is illustrated schematically in the bottom right front corner region of the base unit 56.

The conveying system is also suitable to be used as a vertical conveyor in accumulating operation.

In FIG. 3 the conveying carriage 12 is illustrated in the conveying state. Here, the control device 40 has arranged for the second coupling unit 36 to switch the second rotating shaft 34 to freewheel, so that the second pinion 33 can rotate freely. At the same time, the first pinion 23 is in engagement with the first form-fitting unit 20 moving in the conveying direction F, and the control device 40 has arranged for the first coupling unit 26 to be switched into the coupling state, that is to say the conveying movement F of the chain is transmitted to the conveying carriage 12 via the first pinion 23, the first rotating shaft 24 and the first coupling unit 26. During the conveying movement, the pinion 33 of the rack therefore rotates freely, while, on the other hand, the pinion 23 of the transport chain 20 is rigid.

Now, if a conveying carriage 12 runs against a conveying carriage located in front of it, the control flag 64 of the front conveying carriage 12 comes into contact with the first initiator 62, which then outputs its signal to the control device 40, which then arranges for the first coupling unit 26 to switch the first mating form-fitting unit 22 (first pinion 23 and first rotating shaft 24) to freewheel. At the same time, the second coupling unit 36 is acted on with the effect that the second mating form-fitting unit 32 (second pinion 33 and second rotating shaft 34) is fixed. In this stopped state, the first pinion 23 of the first form-fitting units 20 (chain) thus rotates freely and the second pinion 33 of the second form-fitting unit 30 (rack) is rigid. As a result, secure stop positioning of the conveying carriage is provided, so that the system can also be used without difficulty as a vertical conveyor with accumulating action.

As a result of the form-fitting connection between second pinion 33 and the second mating form-fitting unit 32 (rack), the conveying carriage can be held securely in a vertical position. A friction element as in the prior art is not required. Queuing pressure can be avoided completely by appropriate adjustment of the control flag 64 of the preceding carriage. By means of the second initiator 66 and an additional track of the busbar 42, it is even possible to dispense with separating the conveying carriages 12 at stop points. For this purpose, at the unloading or loading point there can be stop cams, not specifically illustrated in FIGS. 3 to 5, which switch the second initiator 66, whereupon the conveying carriage 12 is kept in the stop position with appropriate switching of the first and second coupling units 26, 36. The conveying carriage can be release in control terms by means of an AND combination of the second initiator 66 and the energization of the busbar 42.

One constructional refinement of the conveying system 10 is illustrated in more detail in FIGS. 6 to 9. In terms of the principle, the conveying system 10 has the same construction according to the schematic illustrations in FIGS. 3 to 5. In addition, the connection of a pallet 58 is further illustrated in FIGS. 6 to 8.

In FIGS. 6 to 9, the representation of the control device 40 and of the first and second initiator 62, 66 has been dispensed with. As can be seen from FIG. 6, in the conveying carriage 12 there is additionally a pressure roller 68, which is arranged rotatably on the side of the guide profile 14 opposite the second pinion 33 and ensures permanent pressure of the second form-fitting unit 30 (rack) against the second pinion 33.

Figure 9:
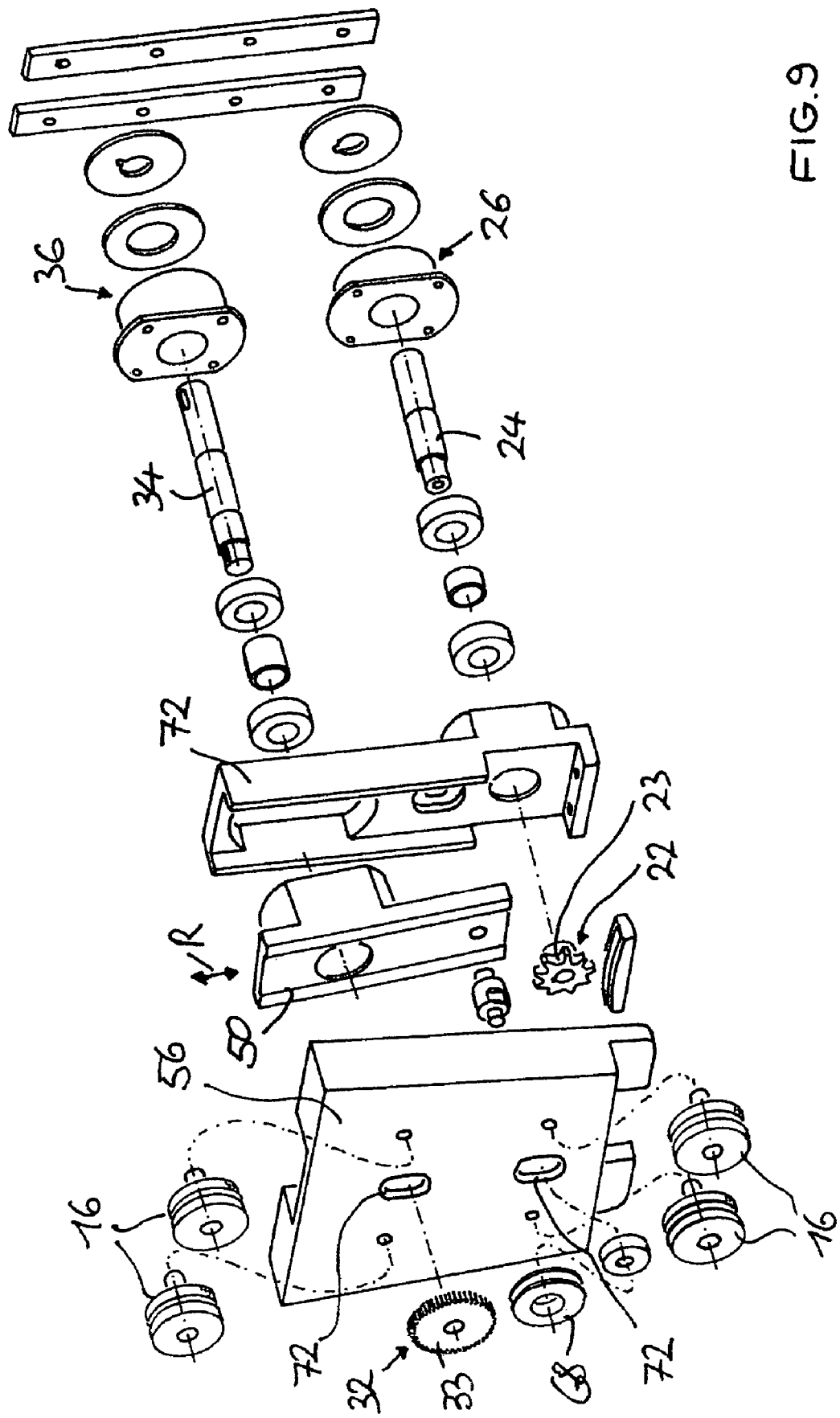
FIG. 9 shows a perspective representation of the individual components of a conveying carriage in an exploded illustration (without control device)

As can be seen in particular from the exploded illustration in FIG. 9, the second mating formfitting unit 32 is mounted on the base unit 56 such that it can be displaced together with the second pinion 33 and the second rotary shaft 34 and the pressure roller 68, a displacement (R) in the direction transverse with respect to the conveying direction F being possible. In order to permit this displacement movement R, the base unit 56 has, in the region of the axes of rotation of the second rotating shaft 34 and the pressure roller 68, a slot recess 72 in each case, through which the axes of rotation are led. The axes of rotation themselves are rotatably mounted on a bearing unit 50 arranged on the rear of the base unit 56, which is in turn displaceably mounted in a further guide unit 72, the guide unit 72 being in turn connected to the base unit 56. As a result of the ability of the mounting of the second mating form-fitting unit 32 to be displaced, the situation is avoided in which, in the region of the curvature of the guide profile 14, because of the changing geometry, compulsive forces occur which could effect increased wear.

In FIGS. 10 to 13, different variants of vertical conveyor systems are indicated which differ in the course of the conveying path.

Figure 10:
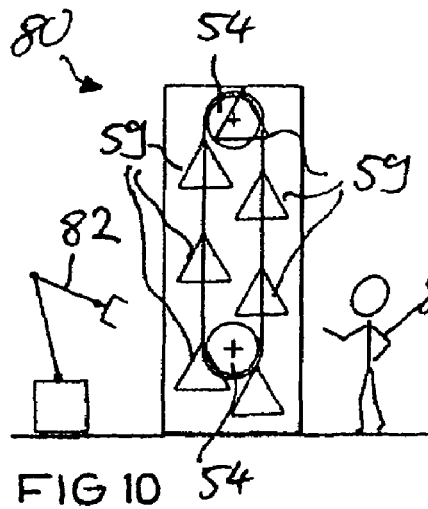
FIGS. 10 to 13 show a schematic representation of the configuration of the conveying path of a conveying system according to the above-mentioned figures.

According to FIG. 10, a circulating vertical conveyor system 80 illustrated, in which unloading is carried out by an operator 81 at one point, the conveying carriages 12 with gondolas then being led upward, but then led downward in order to be loaded on the opposite side by a robot 82.

Figure 11:
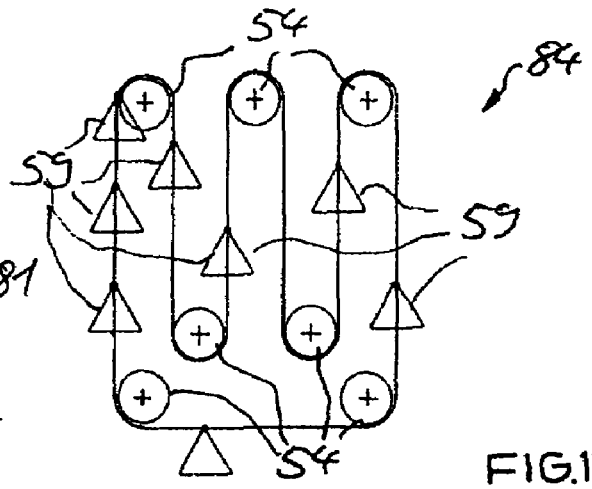

The circulating vertical conveying system 84 illustrated schematically in FIG. 11 has a meandering conveying path course in its upper region and is suitable to be used as a conveying system having a plurality of loading and unloading stations. This system has a high buffer capacity.

Figure 12:
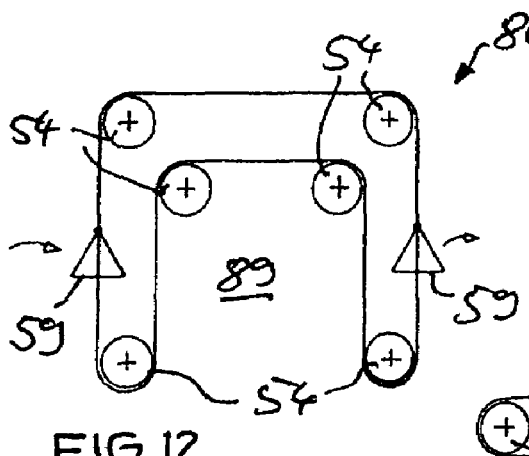
Figure 13:
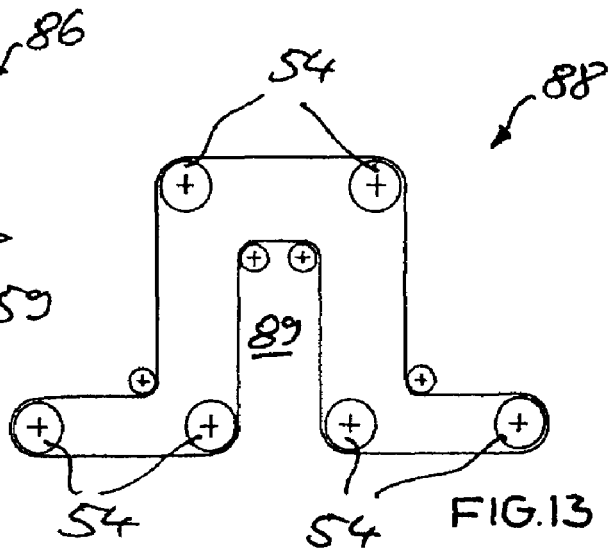

In the conveying systems 86, 88 according to FIGS. 12 and 13, U-shaped inward guidance and U-shaped return of the belt is illustrated schematically, so that, within the conveying system 86, 88, a passage 89 can be created for persons or vehicles such as forklift trucks or the like. The conveying system 88 according to FIG. 13 also has lateral horizontal conveying sections, in order for example to permit easily accessible loading/unloading from above.

Figure 14:
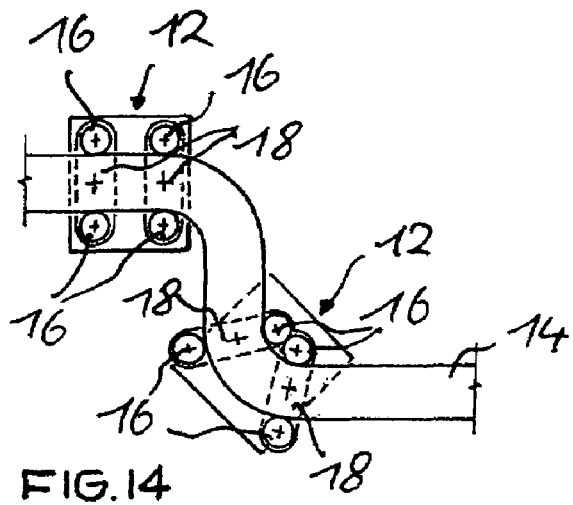
FIG. 14 shows a schematic representation of the conveying path in the region of an S-shaped curved course using rotary bogies for the guide means of the conveying carriage.

In order to permit the most compulsion-free guidance of the conveying carriages in the case of S-shaped conveying path courses, the guide rollers 16 respectively opposite each other in pairs are mounted on a rotating bogie 18 according to the schematic illustration in FIG. 14.

Figure 15:
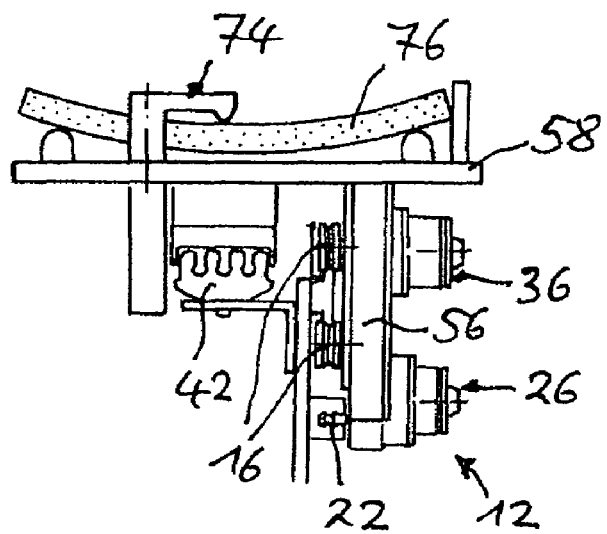
FIG. 15 shows a schematic front longitudinal view of a conveying carriage with pallet and fixing unit present on the pallet in accordance with the basic illustration in FIG. 5.

Since a power connection is available for each conveying carriage 12, it is also possible, for example, to provide a fixing unit 74 for an inserted product 76 on the pallet 58, according to the schematic illustration in FIG. 15. In principle, it is also possible to provide processing units on the pallet.

Figure 16:
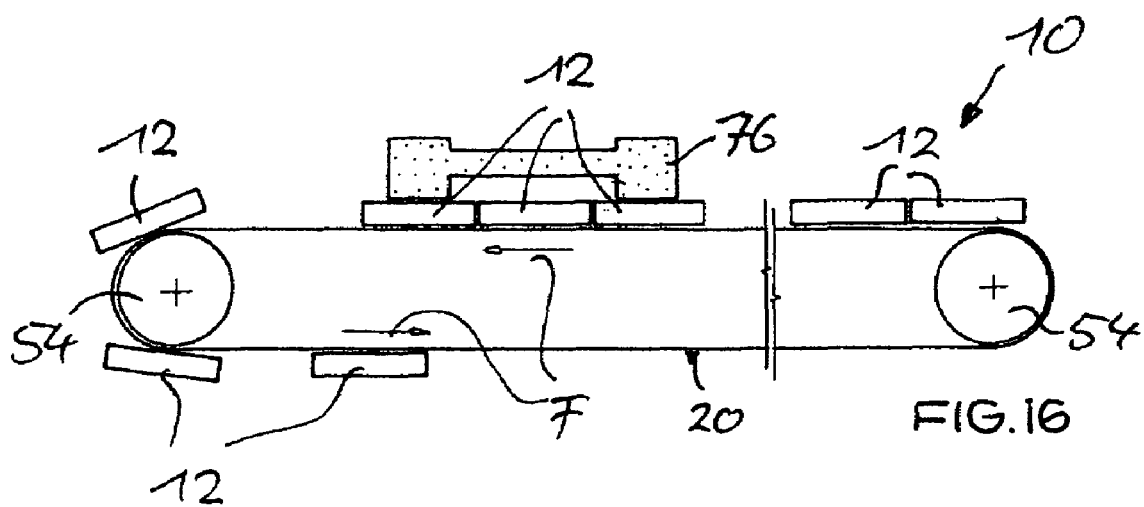
FIG. 16 shows a schematic side view of a conveying system in which a plurality of conveying carriages are combined to form a conveying train, FIGS. 17a, b show a side view and plan view, respectively, of a use of the conveying system in which workpiece carriers are used which have a plurality of workpieces and whose processing is possible with a loading or unloading system having only a horizontal axis.

According to the illustration in FIG. 16, with the conveying system according to the invention it is likewise possible to combine a plurality of conveying carriages 12 to form a pallet. In the illustration in FIG. 16, in this case three pallets with associated conveying carriages 12 are combined to form a train. The first mating form-fitting units 22 of the left-hand and central conveying carriages 12 in FIG. 16 are switched to freewheel. Only the first mating form-fitting unit of the right- and conveying carriage in FIG. 16 is in the coupled state, so that the two conveying carriages located in front of it are pushed by the right-hand conveying carriage 12. As a result, it is possible to transport larger workpieces. Depending on the control system, separation of the individual conveying carriages 12 again can be performed at further positions within the conveying path.

The receiver 79 (FIG. 17) of a light barrier can be mounted on all the conveying carriages 12/pallets. The transmitter part 78 of the light barrier is installed at a predefinable stopping point. Therefore, the conveying carriages 12/pallets can be stopped when the light barrier turns on. On the stationary part, that is to say in the transmitter part 78 of the light barrier, the voltage is simply removed for the purpose of onward travel of conveying carriage 12/the pallet. Therefore, the conveying carriage 12/the pallet travels onward. This constitutes a cost-effective solution for control.

Figure 17:
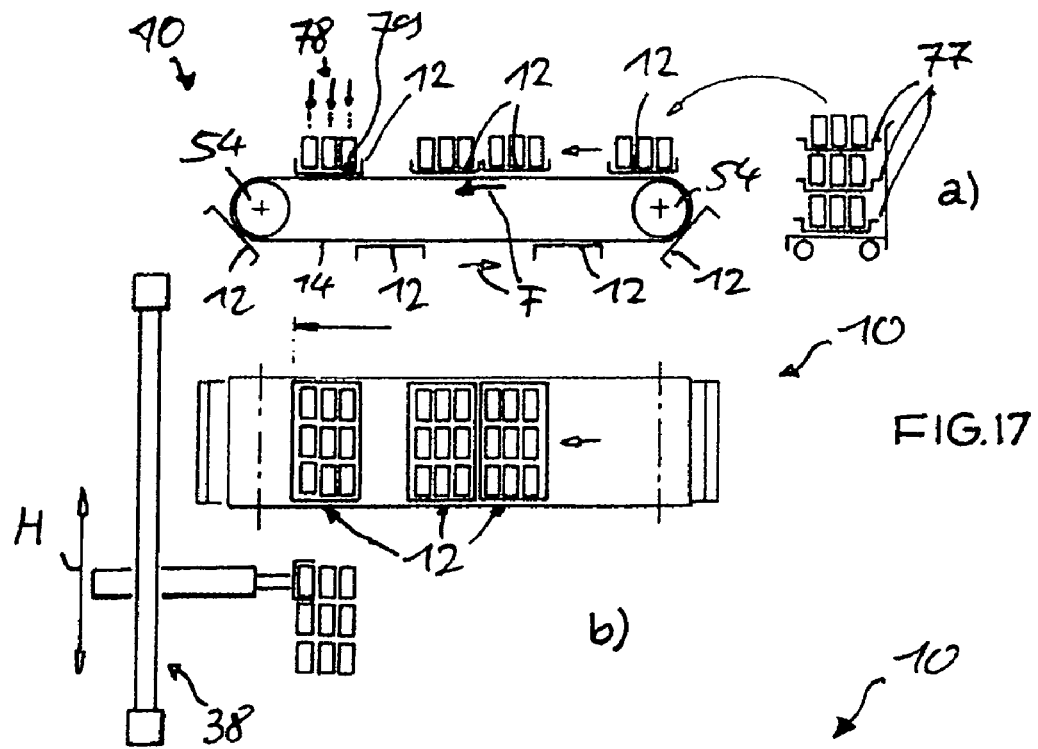

In FIG. 17, a conveying system 10 in which workpiece carriers 77 having a plurality of workpieces are positioned in the gondolas of the conveying system 10 is illustrated schematically. Since the workpiece carrier 77 contains a plurality of workpieces, the repacking of workpieces is dispensed with. The positioning of workplace carriers within an operation can also be carried out automatically via a loading/unloading device. At the stopping points for loading/unloading the workpiece carriers 77, there are three light barrier transmitter parts 78 in the exemplary implement illustrated. On the gondolas there is in each case a light barrier receiver 79. Thus, at the stopping points for loading/unloading the workpiece carrier 77, it is possible to travel to a plurality of positions in a simple way. This brings with it the advantage that, in order to process the individual workpieces by means of a handling apparatus 38, it is possible to process an area, the handling apparatus 38 merely having to have the ability to be displaced about the horizontal axis H.

Figure 18:
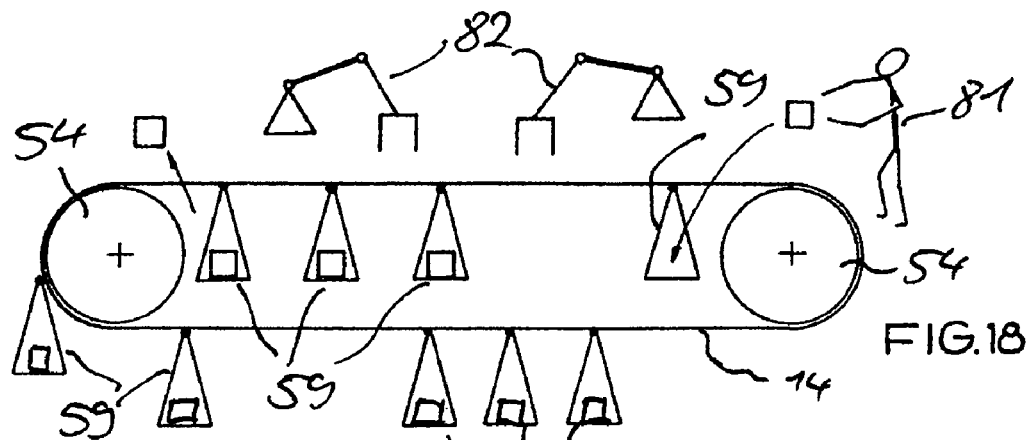
FIG. 18 shows a schematic representation of the side view of a conveying system in which the loading and unloading are carried out in the same position and additional processing possibilities are provided within the conveying operation.

FIG. 18 shows schematically that, in the conveying system 10 according to the invention, it is possible to perform the feeding of parts into a process and the return of processed parts to the delivery point on the same belt. This brings with it, inter alia, the advantage that the operator 81 loads/unloads in the same position.

Figure 19:
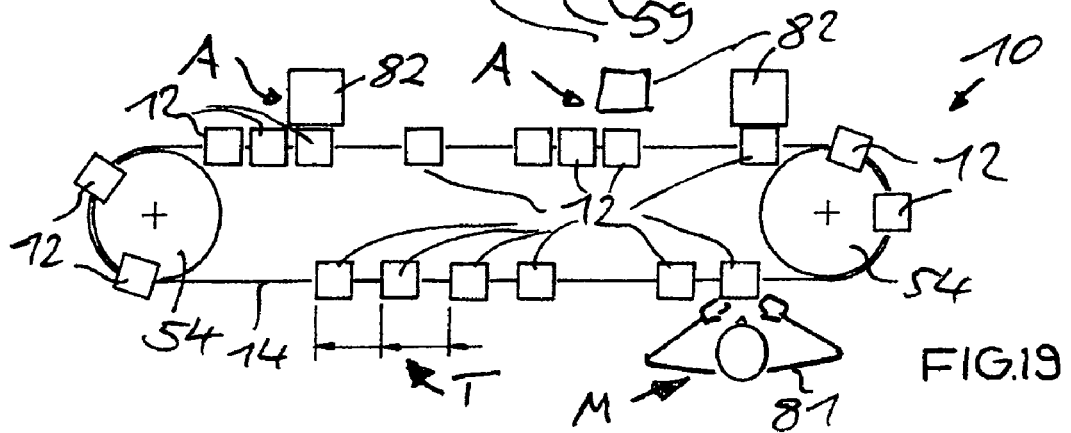
FIG. 19 shows a schematic plan view of the implementation of an assembly belt by using the conveying system, in which cycled conveying operation in some regions, unbuffered/accumulating conveyor operation or manual conveying operation is possible.

FIG. 19 shows schematically in a plan view how the conveying system 10 according to the invention can be used within an assembly system. In this case, there are belt regions in which the conveying carriages/pallets are moved in cycles T, in which the conveying carriages/pallets are buffered or moved in an accumulating manner A or in which the conveying carriages/pallets can be displaced manually M by the operator 81.

The fact that the individual conveying carriages/pallets can specifically be addressed individually, it is possible for example to construct the conveying system according to the invention as a sorting system. To this end, a unit is mounted on the conveying carriage/the pallet which makes it possible for adjacent conveying carriages/pallets to form a holding compartment. By addressing the individual conveying carriages/pallets, the distance between the compartments can be changed. It is therefore possible for an extremely wide range of packing patterns to be implemented, even with products of different size.

Figure 20:
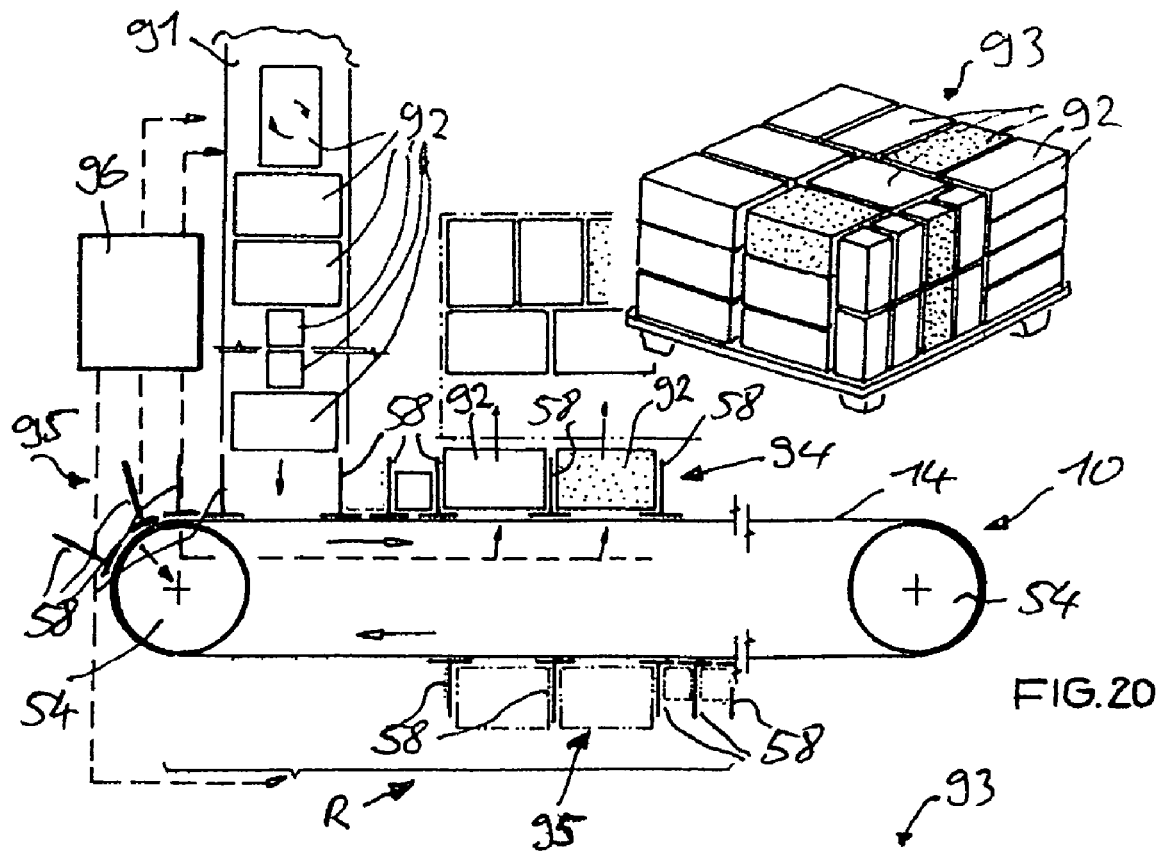
FIGS. 20, 21 show a schematic plan view and a perspective representation, respectively, of the use of the conveying device within the context of a palleting system.
Figure 21:
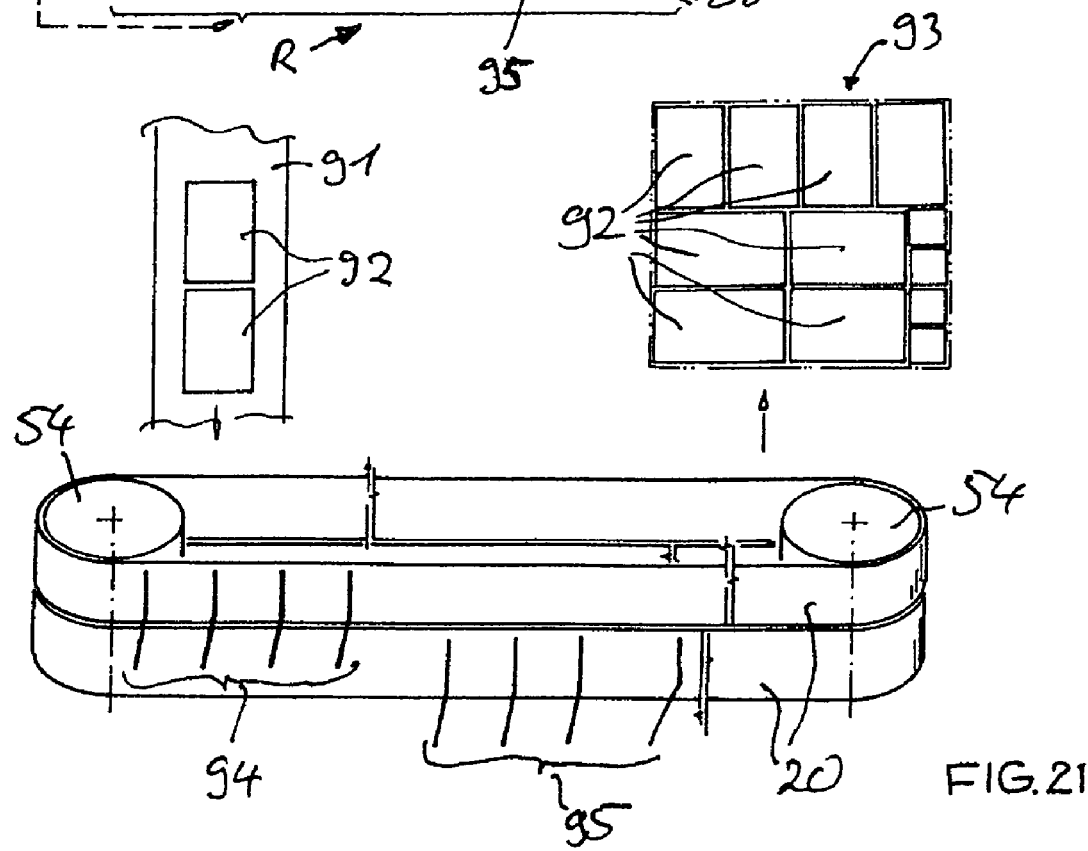

The construction of a palleting system 90 using the conveying system 10 according to the invention is illustrated in FIGS. 20 and 21. Packages 92 are fed cyclically to the conveyor belt of the conveying system 10 via an inlet belt 91. A control device 96 detects the size of the package 92 respectively about to be picked up.

Within the conveying system 10, use is made of a first train 94 and a second train 95 of pallets 58 arranged one after another, which form holding components on account of their spacing. Each train 94, 95 is assigned a first form-fitting unit 20 (chain) which can be driven separately.

At the loading point at the transition point between inlet belt 91 and conveying system 10, a train 94, 95 is filled in accordance with the cycle rate of the inlet belt 91. As soon as the pallet width of the train 94, 95 is reached, the train in FIG. 20 is displaced to the right, is stopped and the packages 92 are pushed on to a package pallet 93. During this operation, the second train 95 is loaded at the loading point, a distance measurement of the individual pallets being carried out in the region of the return path R and the latter being adjusted in accordance with the dimension of the respectively following package 92 to be picked up. The information about the size of the following package to be picked up is supplied via the control device 96, which means that the second train 95 is then waiting at the loading point, the individual pallets being arranged in accordance with the size of the package 92 to be picked up in each case, and changes to cycled delivery operation. The time which is available to feed an unloaded train to the delivery point again corresponds to the time during which the further access to the delivery point is loaded, that is to say the movement of the train outside the delivery station is carried out at a higher speed than the cyclic movement.

In FIG. 21 the pallets 58 forming the compartments for the packages 92 are illustrated in highly schematic form.

The invention claimed is:

1. A conveying system for workpieces or objects, comprising:
    a guide profile;
    conveying carriages which can be moved along the guide profile and in each case have a holding unit, in particular a pallet or gondola, for at least one workpiece or at least one object, each conveying carriage having a control device configured to activate a first coupling unit and a second coupling unit;
    a first form-fitting unit movable substantially parallel to the guide profile via a drive assembly;
    and a first mating form-fitting unit which is respectively mounted on each conveying carriage and can be coupled to the first form-fitting unit,
    wherein:
        the first coupling unit is configured to releasably couple and uncouple the first form fitting unit to the respective first mating form fitting unit;
        a stationary second form-fitting unit is disposed substantially parallel to the guide profile;
        a second mating form-fitting unit is mounted on each conveying carriage such that it can be coupled to the second form-fitting unit, and
        the second coupling unit is configured to releasably couple and uncouple the second form fitting unit to the respective second mating form-fitting unit.

2. The conveying system as claimed in claim 1, wherein during manual movement of the conveying carriage, the first and second form-fitting units are switched to freewheel.

3. The conveying system as claimed in claim 1, wherein at least one conveying carriage has a switching unit which can be actuated manually in order to control the switching state of the first and second coupling units.

4. The conveying system as claimed in claim 1, wherein a power supply of the conveying carriage and of the control device and the first and second coupling units is connected to them via a busbar which runs parallel to the guide profile and can make contact with it.

5. The conveying system as claimed in claim 1, wherein a power supply of the conveying carriage and of the control device and the first and second coupling units is connected to them via an energy storage unit, in particular an accumulator, arranged on the conveying carriage.

6. The conveying system as claimed in claim 1, wherein the control device has a programmable microchip that can be activated.

7. The conveying system as claimed in claim 1, wherein at least one conveying carriage has at least one signal receiving unit which can be acted on by at least one external signal generator unit and which acts on the control device in accordance with the signal received, whereupon the control device switches at least one of the first and second coupling unit.

8. The conveying system as claimed in claim 7, wherein at least one of the first and second mating form-fitting unit has a gear wheel.

9. The conveying system as claimed in claim 8, wherein the first form-fitting unit is constructed as a circulating triplex chain.

10. The conveying system as claimed in claim 8, wherein the second form-fitting unit is constructed as a rack or rigid chain.

11. The conveying system as claimed in claim 10, wherein the second form-fitting unit is mounted on the guide profile.

12. The conveying system as claimed in claim 7, wherein
the first mating form-fitting unit is in engagement with the first form-fitting unit and has a first rotating shaft rotatably mounted on the conveying carriage,
the first coupling unit is constructed as a coupling or braking unit which couples the first rotating shaft to the conveying carriage or switches it to freewheel.

13. The conveying system as claimed in claim 12, wherein the first and second coupling units are arranged on the first and second rotating shafts, respectively.

14. The conveying system as claimed in claim 7, wherein
the second mating form-fitting unit is in engagement with the second form fitting unit and has a second rotating shaft which is rotatably mounted on the conveying carriage,
the second coupling unit is constructed as a clutch or braking unit which couples the second rotating shaft to the conveying carriage or switches it to freewheel.

15. The conveying system as claimed in claim 7, wherein at least one of the first and second mating form-fitting units is rotatably mounted on the conveying carriage via a bearing unit that is mounted on the conveying carriage such that it can be displaced in the direction (R) transverse with respect to the conveying direction (F).

16. The conveying system as claimed in claim 7, wherein there is a data bus line to which the control device makes access.

17. The conveying system as claimed in claim 7, wherein the control device can be activated via an external further control device.

18. The conveying system as claimed in claim 7, wherein the at least one signal receiving unit and at least one signal generating unit are constructed as a light barrier unit with receiver and transmitter.

19. The conveying system as claimed in claim 7, wherein for each conveying carriage, there is a distance registering unit for registering the distance of a following conveying carriage from a preceding conveying carriage which, when the distance exceeds or falls below a predefined minimum, outputs a signal to the control device, which then interrupts or arranges for the conveying movement of the following conveying carriage.

20. The conveying system as claimed in claim 19, wherein each respective distance registering unit is implemented in that each conveying carriage has a first initiator and a control flag, the control flag switching the initiator of the following conveying carriage when the minimum distance between adjacent conveying carriages is reached.

21. The conveying system as claimed in claim 7, wherein there is a position registering unit for registering the position of conveying carriages along the conveying path which, when a predefined position is reached, outputs a signal to the control device of the respective conveying carriage, which then interrupts the conveying movement of the conveying carriage.

22. The conveying system as claimed in claim 7, wherein on the conveying carriage there are guide rollers, corresponding with the guide profile.

23. The conveying system as claimed in claim 22, wherein there are guide means arranged opposite on the guide profile, which are arranged, in particular in pairs, on a rotating bogie rotatably mounted on the conveying carriage.

24. The conveying system as claimed in claim 7, wherein first form-fitting unit is preferably constructed as a circulating unit which can be driven via a drive assembly.

25. The conveying system as claimed in claim 24, wherein the drive assembly has a slipping clutch.

26. The conveying system as claimed in claim 24, wherein the drive assembly is constructed such that it can be activated to optionally produce a cyclic, accelerated or retarded conveying movement.

27. The conveying system as claimed in claim 7, wherein the conveying direction (F) runs vertically, at least in some regions.

28. The conveying system as claimed in claim 27, wherein system has, at least in some regions, a course which points upward and then downward and which in particular forms a passage.

29. The conveying system as claimed in claim 28, wherein the course pointing upward and downward is constructed substantially in a U-shape or V-shape and offers a passage opening for at least one of persons and vehicles.

30. The conveying system as claimed in claim 7, wherein the system is constructed as an assembly belt which circulates as viewed in a plan view.

31. The conveying system as claimed in claim 7, wherein the conveying direction (F) runs in a meandering shape in the vertical, at least in some regions.

32. The conveying system as claimed in claim 17, wherein the external control device is constructed such that it can address each conveying carriage individually via the respective control device.

33. The conveying system as claimed in claim 7, wherein the system is used within the context of a sorting system.

34. The conveying system as claimed in claim 7, wherein the system is used within the context of a palleting system.

35. The conveying system as claimed in claim 7, wherein the system is constructed in such a way that the conveying carriages can be moved at least one of cyclically in some regions and in an accumulating manner in some regions and manually in some regions.

36. The conveying system as claimed in claim 7, wherein on at least one conveying carriage, there is a fixing unit and/or processing unit for fixing and/or processing the respective workpiece or object.

37. The conveying system as claimed in claim 7, wherein the state in which the conveying carriage is moving, the first coupling unit switches the first mating form-fitting unit into the coupling state with the first form-fitting unit and the second coupling unit switches the second mating form-fitting unit to freewheel and, in the state in which the conveying carriage is stopped, the first coupling unit switches the first mating form-fitting unit to freewheel and switches the second coupling unit into the coupling state of the second mating form-fitting unit with the second form-fitting unit or fixes the second mating form-fitting unit.

* * * * *